(12) United States Patent
Barland

(10) Patent No.: US 10,228,033 B2
(45) Date of Patent: Mar. 12, 2019

(54) CALIPER COVER

(71) Applicant: Michael Barland, Chula Vista, CA (US)

(72) Inventor: Michael Barland, Chula Vista, CA (US)

( * ) Notice: Subject to any disclaimer, the term of this patent is extended or adjusted under 35 U.S.C. 154(b) by 0 days.

(21) Appl. No.: 15/709,260

(22) Filed: Sep. 19, 2017

(65) Prior Publication Data

US 2018/0080512 A1 Mar. 22, 2018

Related U.S. Application Data

(60) Provisional application No. 62/396,716, filed on Sep. 19, 2016.

(51) Int. Cl.
*F16D 65/00* (2006.01)
*F16D 65/847* (2006.01)
*F16D 55/00* (2006.01)

(52) U.S. Cl.
CPC ..... *F16D 65/0081* (2013.01); *F16D 65/0087* (2013.01); *F16D 65/847* (2013.01); *F16D 2055/007* (2013.01)

(58) Field of Classification Search
CPC ............. F16D 65/0081; F16D 65/0087; F16D 65/0031; F16D 65/847
See application file for complete search history.

(56) References Cited

U.S. PATENT DOCUMENTS

| | | | | |
|---|---|---|---|---|
| 3,605,956 A | * | 9/1971 | Hahm et al. | F16D 65/0977 188/216 |
| D476,275 S | * | 6/2003 | Winkler | F16D 55/22 D12/180 |
| 2004/0074716 A1 | * | 4/2004 | Brumfield | F16D 55/22 188/218 A |
| 2009/0321198 A1 | * | 12/2009 | Barland | F16D 65/0031 188/264 A |
| 2018/0231076 A1 | * | 8/2018 | Choi | F16D 65/0006 |

* cited by examiner

*Primary Examiner* — Melanie Torres Williams
(74) *Attorney, Agent, or Firm* — Donn K. Harms

(57) ABSTRACT

A brake caliper cover to cover the calipers of vehicles having disc brakes. The cover has a mount formed by a body having two ends configured to each engage with the two guide pins for the brake pads housed in a cavity of the caliper. The cover engages to the body of the mount using one or a plurality of supports engaged to the cover which are removably engageable to connectors on the mount.

16 Claims, 2 Drawing Sheets

CALIPER COVER

This application claims priority to U.S. Provisional patent application Ser. No. 62/396,716 filed on Sep. 19, 2016, which is incorporated in its entirety herein by this reference thereto.

FIELD OF THE INVENTION

The disclosed device concerns brake calipers employed on motor vehicles such as cars and trucks. More particularly, the device relates to a caliper cover having an easily engaged top loading mount which provides a stable engagement of the caliper cover to the brake caliper.

BACKGROUND OF THE INVENTION

Motor vehicles have, since their inception, required a means for slowing and stopping the vehicle. Over time, two types of brake systems developed for that purpose. One such system is the drum brake, which uses friction caused by a set of opposing shoes or pads when they press outward against a rotating cylinder-shaped drum to which the wheel is engaged. In more recent times, a second mode of wheel braking developed using calipers which compress opposing pads upon a rotor engaged with the wheel.

Caliper braking has proven to be a significant improvement over drum brakes and is conventionally employed on at least the front wheels of modern autos and truck. In use, the two opposing pads are compressed against the perimeter of a rotor engaged to the axle of the wheel they are intended to brake. In use, a pressing of the brake pedal on the vehicle causes the caliper holding the opposing pads to compress against the rotor thereby slowing the wheels and the vehicle.

While the employment of calipers with opposing pads in disk brake systems improves braking, there are a number of problems associated with such systems from an owner's standpoint. Unlike drum brakes, which tend to prevent dust from the shoes from contacting the wheel rim, calipers inherently eject brake shoe dust onto the wheel and caliper during use due to the open caliper and force of the rotor running through it. The dust is the byproduct of the frictional engagement of the brake pads with the spinning rotor during stopping of the wheel. While functionally not a serious problem, most drivers consider the brake dust unsightly on the caliper when viewed through holes in the wheel. Further, many drivers consider the caliper itself unsightly.

Other problems associated with braking systems employing calipers and rotors, are heat generation during from the frictional engagement of the brake discs with the rotor, and additionally the communication of the dust from the brake pads not only to the caliper but to a sticky engagement upon the wheels and surface of the car and surrounding wheel well.

One prior art remedy concerning the caliper dust employed covers for the calipers in an attempt to hide them from view and limit dust communication. However, previous caliper covers generally glue to the caliper which is unsafe and hard to remove or require the removal of the caliper from its mount and the employment of special tools and mounting components to provide a mount for the caliper cover. This is beyond the scope of most owner's skills and tool collections. Other caliper covers have been disclosed using connectors to an edge of the caliper. However, such are not functional for calipers configured for insertion and removal of the disc pads through a top opening.

As such, there exists an unmet need for a caliper cover mounting system that will engage and disengage easily with a brake caliper having an open end opposite the wheel for insertion and removal of disc pads. Such a caliper cover mounting system should be configured to easily engage with existing caliper pins and housings and provide a secure engagement of the cover to the caliper. Such a system should be configured to allow for translation of the cover toward and away from the caliper, but also provide limitation to prevent contact with the spinning wheel adjacent the cover. Finally, such a caliper cover mounting system should provide aesthetic enhancement of the view of the caliper through the slots of the wheel, and be configured to prevent dust from sticking to the wheel and also provide cooling to the caliper using air venting past the cover on a moving vehicle.

SUMMARY OF THE INVENTION

The device as herein disclosed and described overcomes the shortcomings of prior art by the provision of a caliper cover system which provides a cover which is configured to engage a mount adapted for engagement with the pins retaining disc pads within a caliper having an open side opposite the side facing the wheel axle. Such a configuration is a popular mode for the provision of calipers for brakes on vehicles since this configuration of a caliper allows for removal and replacement of the disc pads through the opening.

The caliper cover mounting system herein provides a caliper mount having a body which is adapted on opposing ends to engage conventional pin guides engaged within brake calipers having an opening for insertion and removal of disc pads. The guide pins are removably engageable with openings in opposing sides of the caliper on opposite sides of a cavity communicating with the opening. This opening is positioned on a first side of the caliper which is opposite a second side of the caliper positioned closest to the wheel axle with the caliper operatively engaged to the axle.

The caliper mount has a body which is flexible and preferably formed of spring steel to allow for flexure during engagement and disengagement of opposite ends of the caliper mount, with respective guide pins. To that end, the body of the caliper mount has curved portions of the body defining the mount, at opposite ends. These curved portions of the body have a radius configured to form respective hooks which surround and have a radius to contact the exterior surface of a guide pin when the caliper mount has each of two ends each engaged with one of the respective guide pins.

At a central area of the body forming the mount is a central portion of the body which is planar and situated in between elevated planar portions of the body which are adjacent each of the two ends of the body. Angled portions of the body on opposite sides of the central portion angle upward from the central portion to each planar portion. On ends of the planar portions of the body, closest to the curved portions on each end, are secondary angled portions angling downward to the curved ends. This configuration places both of two planar portions adjacent each end of the body, elevated above the central portion.

This is a preferable configuration of the body of the mount because when both of the two ends of the body are operatively engaged around respective guide pins, the central portion is positioned below the edge of the opening to the cavity. A limiting member projects from the central portion toward the sidewall defining the cavity and will contact it if the body of the mount is slid on its engagement with the guide pins in a direction toward the wheel and the engaged caliper cover. This contact of the limiting member prevents sliding of the body of the mount too far toward the wheel which would cause the caliper cover to contact the wheel during use. The opposite side of the body of the mount in the central portion, has a gap between an edge of the body and the opposing sidewall of the cavity from that contacted by the limiting member. This allows the mount to slide in a direction away from the wheel and the cover to move the cover closer to the caliper if necessary or desired.

Each of these planar portions adjacent each end of the body of the mount have a connector for engagement to one of two planar support members extending from a connection to a cover. As depicted, the connector may be a threaded member sized to communicate through an aperture on the support member and sandwich the support member in between a complimentary threaded nut and the planar portion of the body from which the threaded member projects. Other complimentary connectors may be employed of course. However, it has been found in experimentation, that the compressive sandwiched engagement of each of the support members between a nut and planar portion of the body of the mount, works well to maintain engagement and resist dismounting from vibration, moisture, and temperature variations.

Each of the support members extends, from a respective removable engagement with one of the threaded members on the body of the mount and first ends, to connections to the caliper cover at second ends. The cover, so connected to the mount with the support members can, as noted, be slid away from the caliper toward the wheel until the limiting member contacts the sidewall of the cavity, and can be slid in the opposite direction the width of the gap on the opposite side of the body until the cover contacts the caliper. This allows for lateral adjustment by the user, and because the ends of the body of the mount are in a hooked and biased engagement with the guide pins, friction will normally hold the position.

The cover member is preferably curved in fashion to surround one side of the caliper to block the view of the caliper when viewed through the slots of the wheel of the axle the caliper engages. The curved surface urges incoming air through a gap between the cover and caliper and tend to vent brake dust rearward out the back of the gap closest to the rear of the vehicle. Optional slots may be included that have flanges adapted to catch airflow passing the side surface of the cover and direct it toward the caliper of a moving vehicle. This focusing of airflow will cool the caliper of the moving vehicle and aid in keeping the caliper cool and brake fluid operating the caliper from boiling.

It is, thus, an object of this invention to provide a caliper cover system which has a mount adapted for engagement between two guide pins employed in calipers having open sides for insertion and removal of disc pads.

It is a further object of this invention to provide such a caliper cover that employs this simple mounting system allowing user installation with minimal tools and time and without removing the caliper from its mount.

It is a further object of this invention to provide such a caliper cover which optionally is shaped to surround the caliper and block viewing thereof and also direct air between the cover and the caliper to diffuse dust and cool the caliper.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing other devices, methods and systems for carrying out the several purposes of the present disclosed device for providing an easily mounted and highly utilitarian caliper cover. It is important, therefore, that the objects and claims be regarded as including such equivalent construction and methodology, insofar as they do not depart from the spirit and scope of the present invention.

DETAILED DESCRIPTION OF PREFERRED EMBODIMENTS

Figure 1:
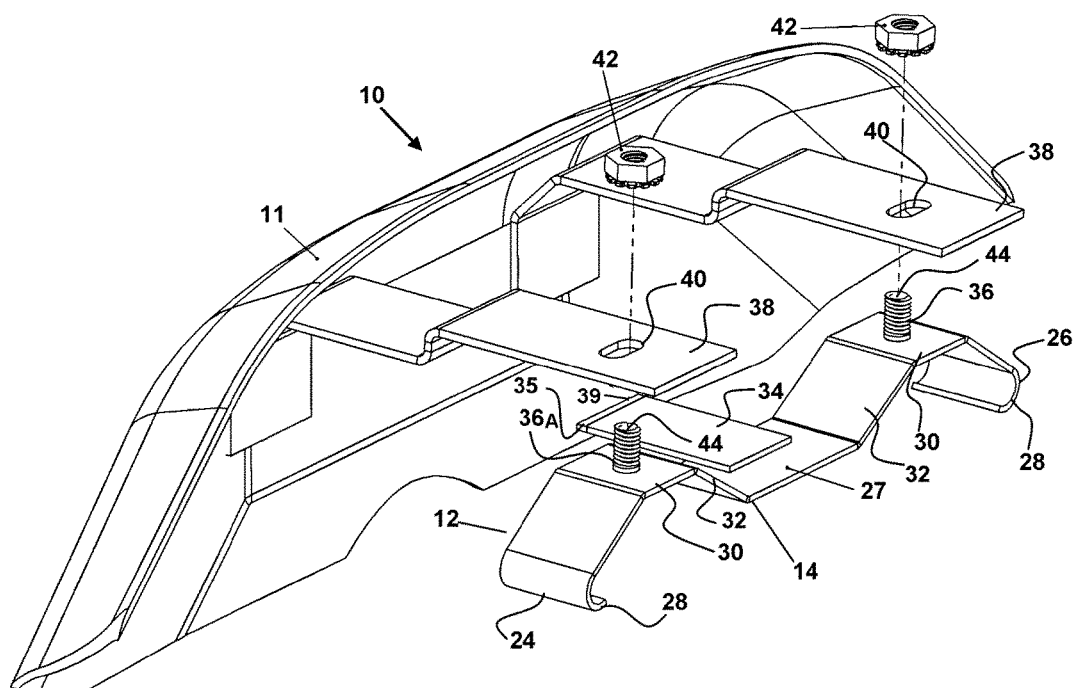
FIG. 1 depicts a perspective exploded view of the caliper device in showing the body defining the mount and showing the cover and support members engageable with connectors on the body of the mount.
Figure 2:
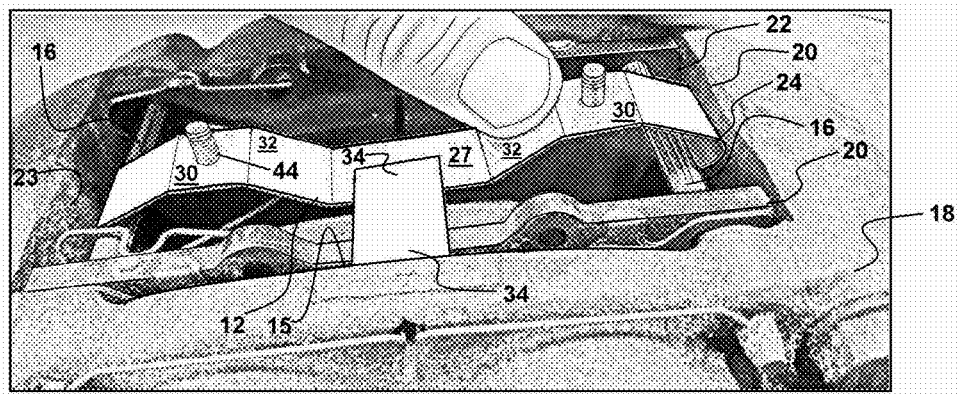
FIG. 2 depicts the body forming the mount of the caliper cover device of FIG. 1 which is adapted on each end for engagement upon a pair of guide pins accessible through an opening in a first side of the caliper.
Figure 3:
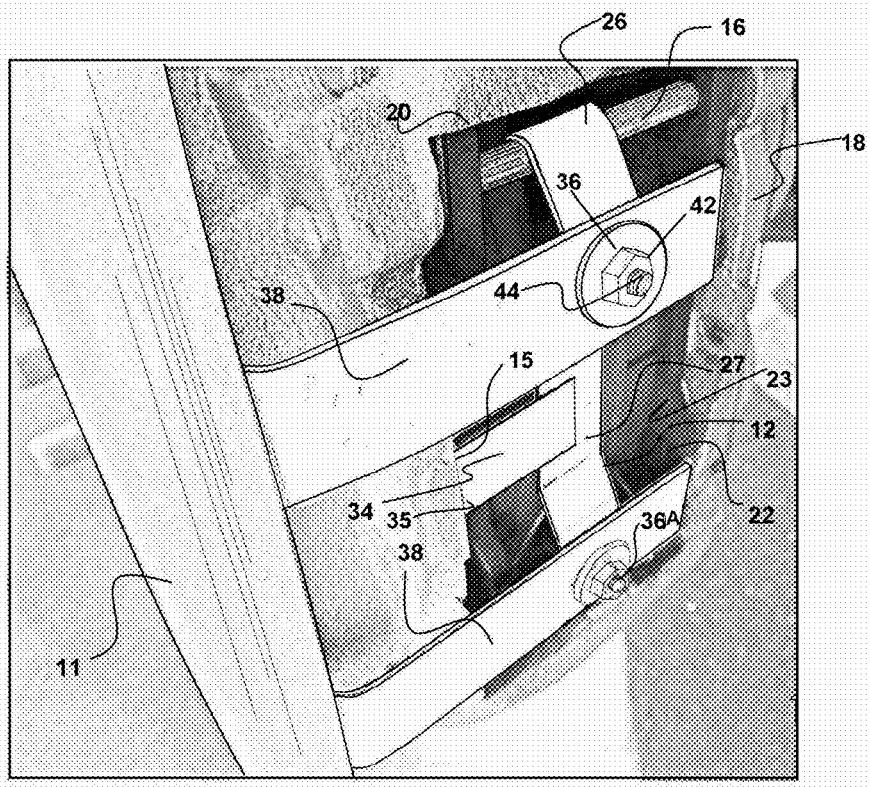
FIG. 3 depicts the caliper cover device herein engaged with the body which in engagement with the two guide pins of the caliper and connected to the support members which hold the cover adjacent to a side of the caliper.

Referring now to the drawings in FIGS. 1-3, wherein similar parts are identified by like reference numerals, the caliper cover device 10 as shown in the exploded view of FIG. 1 and the engaged position of FIG. 3, includes a caliper mount 12 having a body 14 configured to operatively engaged with a pair of guide pins 16 (FIG. 3) employed in a conventional top-loading brake caliper 18 having an opening 20 on a first side communicating with a cavity 22 in which a pair of disc brake pads 20 translate to engage a rotor.

The body 14 forming the mount 12 is adapted with a first and second pin connector, on opposing ends, to engage conventional guide pins engaged within brake calipers having an opening for insertion and removal of disc pads. The body 14 is preferably formed of rigid metal capable of slight flexing, such as spring steel, but may be formed of other materials suitable to the function.

A preferred pin connector at a first end of the body 14 is a first curved portion 24 and a second preferred pin connector to engage the guide pin at a second end of the body 14 is a second curved portion 26. Situated centrally, in between the two curved portions 24 and 26 of the mount 12, is a central portion 27. The two curved portions 24 and 26, body have a radius configured to form respective first and second hooks 28 where a lower or second surface of the body 14 at each formed hook 28 is positionable to a curved contact with at least the lower surface of the body 14 of the mount 12 at each hook 28 with an exterior circumferential surface of one respective guide pin 16. This engagement of pin connectors at both ends of the mount 12 is currently preferably achieved where each of two ends 24 and 26 of the mount 12 are engaged with one of the respective guide pins 16.

The central portion 27 of the body 14 is shown as planar and situated in between first and second elevated planar portions 30 of the body 14 which are respectively situated adjacent to the two ends of the body 12. In one preferred mode of the device 10 allowing for more adjustment of positioning of the cover 11 vertically to cover the brake caliper, the planar portions 30 of the body 14 are both elevated above the central portion 27. The first and second planar portions 30 are supported by angled portions 32 of the body 14 of the mount 12 positioned on opposite sides of the central portion 27. These angled portions 32 angle upward from the central portion 27 to each planar portion 30. The angled portions 27 formed to incline toward the planar portions engaged with connectors, are particularly preferred as it has been found in experimentation, each forms a flex point in the body 14 during installation, to allow for easier flexing of the mount 12 at both ends, to allow for an easier engagement of the two ends or the hooks 28 onto the guide pins 16 of the wheel caliper by allowing for easier upward flex during such an engagement.

A limiting member 34 may project away from a side edge of the central portion 27 of the body 14 of the mount 12. The distal end 35 of the limiting member 34 is spaced from the side edge 15 of the body 14 from which it extends, a distance to form a contact the distal end 35 with a sidewall 23 defining the cavity 22 in the caliper. This contact thereby limits travel of the mount 12 toward the sidewall 23 once both ends are engaged with the guide pins 16. While it was found that the hooks 28 in a frictional engagement around the guide pins worked well in most instances to hold the mount 12 in place, in some situations where road conditions caused vibration on the caliper and pins unexpectedly travel occurred in that engagement with the pins.

After much experimentation with shaped and surfaced hooks 28 to form a tighter connection, such was not foolproof in all conditions. The limiting member 34 was found to provide a solution and prevent travel of the mount 12 toward the wheel side of the caliper which could cause contact of the cover 11 with the wheel (not shown but well known as positioned adjacent the caliper) and is as such preferred. This limiting member 34 projects from a side of the body 14 defining the mount 12, on which the cover 11 is to be positioned during operative engagement to a brake caliper 18.

Currently, the limiting member 34 extends from the central portion 27 which is located in-between the angled portions 32 at their lowest point. This will normally position the elevation of the central portion 27 below an edge of the caliper 18 within the cavity therein, and thereby position the distal end of the limiting member 34 in a position to contact an interior sidewall of the cavity 22 and thereby limit travel toward the cover 11 and wheel.

Each of the planar portions 30 adjacent a pin connector at opposite ends of the body 14 forming the mount 12, have one of a first connector 36 and second connector 36A positioned on an upper or first surface of the body 14 extending from a planar portion 30 which is configured to removably engage with a respective one of a pair of support members 38 extending from a connection to the cover 11. As depicted each of a first connector 36 and second connector 36A, may be a combination of a threaded member 44 sized to communicate through an aperture 40 in the support member 38 and sandwich the support member 38 in between a threaded nut 42, and the first surface of the body 14 in the area of the planar portion 30 from which each connector 36 and 36A such as the depicted threaded member 44 projects.

Thus, in a preferred mode each connector 36 and 36A herein depicted can be a combination of a threaded nut 42 engaging a threaded member 44 projecting from the first surface of the body 14 of the mount 12 in a position to compressively engage with one of a pair of support members 38. It should be noted support for holding the cover 11 in position can be accomplished by a single support member 38 configured to engage with a single connector 36 extending from the top or first surface of the body 14 and thereby hold the cover 11 in position. However, such is not preferable as it would be less stable than a pair of connectors 36 and 36A engaging a pair of support members 38. Further, other connectors to operatively engage the mount 12 to the cover 11 could be employed such as a first and second slot formed in the side of the body 14 frictionally engaging the distal ends of the support members 38, or another removable or fixed engagement of the support members 38 to the body 14. Currently a threaded member 44 and nut 42 are particularly preferred for ease of installation as once the mount 12 is engaged with the guide pins in the caliper it positions the threaded members 44 upright and easy to engage with the support members 38 during installation with the wheel removed.

In a permanently engaged mode of the device herein where no adjustment in situ is desired or required, the first and second connector engaging the support members 38 to the body 14 of the mount 12 could be by welding or adhesive or other permanent engagement.

With the mount 12 operatively engaged with the pins 16 by engagement of the surfaces of the hooks 28, each of the support members 38 extends from a respective removable engagement to the body 14 at first ends to respective connections to the brake caliper cover 11 at second ends. The cover 11 so connected to the mount with the support members 38, can as noted be slid away from the brake caliper 18 toward the wheel if needed until the limiting member 34 contacts the sidewall 23 of the cavity 22. This limiting member 34 may be formed with separable sections 39 to allow the user to remove a section to slide the cover 11 away from the brake caliper and toward the wheel if the configuration of the brake caliper requires such as a thicker caliper sidewall requiring more translation of the cover 11 to clear it. The limiting member 34 can be scored to render the separable sections 39 removable by simply bending them and breaking them off or they may be made otherwise easily separable.

The cover 11 member is preferably curved in fashion so surround one side of the brake caliper 18, to block the view of the brake caliper. So positioned, adjacent the brake caliper 18 the cover 11 is securely supported by the support members 38 connected to the body 14 which is securely but removably engaged at both ends with the guide pins 16.

It is to be understood that elements of different construction and configuration and different steps and process procedures and other arrangements thereof, other than those illustrated and described, may be employed for providing the easily mounted decorative and functional caliper covers herein.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A brake caliper cover apparatus, comprising:
a mount having a body having a first end and having a second end opposite said first end, having a central portion of said body therebetween;
said body having a first surface extending between said first end and said second end and having a second surface opposite said first surface;
a first pin connector located at said first end, said first pin connector adapted to removably engage with a first guide pin communicating across a cavity within a brake caliper;
a second pin connector located at said second end, said second pin connector adapted to engage with a second guide pin communicating across said cavity within a brake caliper;
a cover having a first support member extending therefrom to a distal end;
a first connector positioned upon said central portion of said body, said first connector engageable to said first support member at or adjacent said distal end thereof; and
whereby said body in an engaged position, where said first pin connector is engaged with said first guide pin and said second pin engaged with said second guide pin, positions said first connector to a position of engagement with said first support member which engagement holds said cover adjacent a side surface of said brake caliper.

2. The brake caliper cover apparatus of claim 1, additionally comprising:
a limiting member having a first end engaged with said central portion of said body and extending away from a side edge of said body, to a distal end; and
said distal end positioned a distance from said side edge of said body which is configured to form a contact between said distal end against a side surface of said cavity of said brake caliper.

3. The brake caliper cover apparatus of claim 1, additionally comprising:
said cover having a second support member extending therefrom to a distal end;
a second connector positioned upon said central portion of said body, said second connector engageable to said second support member at or adjacent said distal end thereof; and
said body in said engaged position with said first pin connector engaged with said first guide pin and said second pin engaged with said second guide pin, positions said first connector to a position of engagement with said first support and positions said second connector to a position of engagement with said second support member, where said first support member and said second support member jointly hold said cover adjacent said side surface of said brake caliper.

4. The brake caliper cover apparatus of claim 2, additionally comprising:
said cover having a second support member extending therefrom to a distal end;
said cover having a second support member extending therefrom to a distal end;
a second connector positioned upon said central portion of said body, said second connector engageable to said second support member at or adjacent said distal end thereof; and
said body in said engaged position with said first pin connector engaged with said first guide pin and said second pin engaged with said second guide pin, positions said first connector to a position of engagement with said first support and positions said second connector to a position of engagement with said second support member, where said first support member and said second support member jointly hold said cover adjacent said side surface of said brake caliper.

5. The brake caliper cover apparatus of claim 1, additionally comprising:
said first pin connector is a first hook positionable to a curved contact of a portion of said lower surface of said body to a hooked engagement around an exterior circumferential surface of said first guide pin; and
said second pin connector is a second hook positionable to a curved contact of a portion of said lower surface of said body to a hooked engagement around an exterior circumferential surface of said second guide pin.

6. The brake caliper cover apparatus of claim 2, additionally comprising:
said first pin connector is a first hook positionable to a curved contact of a portion of said lower surface of said body to a hooked engagement around an exterior circumferential surface of said first guide pin; and
said second pin connector is a second hook positionable to a curved contact of a portion of said lower surface of said body to a hooked engagement around an exterior circumferential surface of said second guide pin.

7. The brake caliper cover apparatus of claim 3, additionally comprising:
said first pin connector is a first hook positionable to a curved contact of a portion of said lower surface of said body to a hooked engagement around an exterior circumferential surface of said first guide pin; and
said second pin connector is a second hook positionable to a curved contact of a portion of said lower surface of said body to a hooked engagement around an exterior circumferential surface of said second guide pin.

8. The brake caliper cover apparatus of claim 4, additionally comprising:
said first pin connector is a first hook positionable to a curved contact of a portion of said lower surface of said body to a hooked engagement around an exterior circumferential surface of said first guide pin; and
said second pin connector is a second hook positionable to a curved contact of a portion of said lower surface of said body to a hooked engagement around an exterior circumferential surface of said second guide pin.

9. The brake caliper cover apparatus of claim 3, additionally comprising:
said first connector being a first threaded member extending from a first end engaged with said first surface of said body adjacent said first end thereof;
said second connector being a second threaded member extending from a first end engaged with said first surface of said body adjacent said first end thereof;
said first connector engageable through an aperture formed in said first support member;
a first nut engageable to said first threaded member;
said second connector engageable through an aperture formed in said second support member; and
a second engageable to said second threaded member.

10. The brake caliper cover apparatus of claim 4, additionally comprising:
said first connector being a first threaded member extending from a first end engaged with said first surface of said body adjacent said first end thereof;
said second connector being a second threaded member extending from a first end engaged with said first surface of said body adjacent said first end thereof;
said first connector engageable through an aperture formed in said first support member;
a first nut engageable to said first threaded member;
said second connector engageable through an aperture formed in said second support member; and
a second engageable to said second threaded member.

11. The brake caliper cover apparatus of claim 7, additionally comprising:
said first connector being a first threaded member extending from a first end engaged with said first surface of said body adjacent said first end thereof;
said second connector being a second threaded member extending from a first end engaged with said first surface of said body adjacent said first end thereof;
said first connector engageable through an aperture formed in said first support member;
a first nut engageable to said first threaded member;
said second connector engageable through an aperture formed in said second support member; and
a second engageable to said second threaded member.

12. The brake caliper cover apparatus of claim 8, additionally comprising:
said first connector being a first threaded member extending from a first end engaged with said first surface of said body adjacent said first end thereof;
said second connector being a second threaded member extending from a first end engaged with said first surface of said body adjacent said first end thereof;
said first connector engageable through an aperture formed in said first support member;
a first nut engageable to said first threaded member;
said second connector engageable through an aperture formed in said second support member; and
a second engageable to said second threaded member.

13. The brake caliper cover apparatus of claim 4, additionally comprising:
said limiting member positioned upon said body in-between said first connector and said second connector;
inclining angled portions of said body extending between a portion of said body engaged with said limiting member and a pair of respective portions of said body respectively engaged with said first connector and said second connector; and
said angled portions providing respective flex points on said body during engagement of said first end to said first guide pin and said second end to said second guide pin.

14. The brake caliper cover apparatus of claim 8, additionally comprising:
said limiting member positioned upon said body in-between said first connector and said second connector;
inclining angled portions of said body extending between a portion of said body engaged with said limiting member and respective portions of said body respectively engaged with said first connector and said second connector; and
said angled portions providing respective flex points on said body during engagement said first hook to said first guide pin and said second hook to said second guide pin.

15. The brake caliper cover apparatus of claim 10, additionally comprising:
said limiting member positioned upon said body in-between said first connector and said second connector;
inclining angled portions of said body extending between a portion of said body engaged with said limiting member and a pair of respective portions of said body respectively engaged with said first connector and said second connector; and
said angled portions providing respective flex points on said body during engagement said first end to said first guide pin and said second end to said second guide pin.

16. The brake caliper cover apparatus of claim 12, additionally comprising:
said limiting member positioned upon said body in-between said first connector and said second connector;
inclining angled portions of said body extending between a portion of said body engaged with said limiting member and respective portions of said body respectively engaged with said first connector and said second connector; and
said angled portions providing respective flex points on said body during engagement said first hook to said first guide pin and said second hook to said second guide pin.

* * * * *